No. 832,969. PATENTED OCT. 9, 1906.
E. L. HALL.
CAMERA.
APPLICATION FILED MAY 23, 1905.
2 SHEETS—SHEET 2.
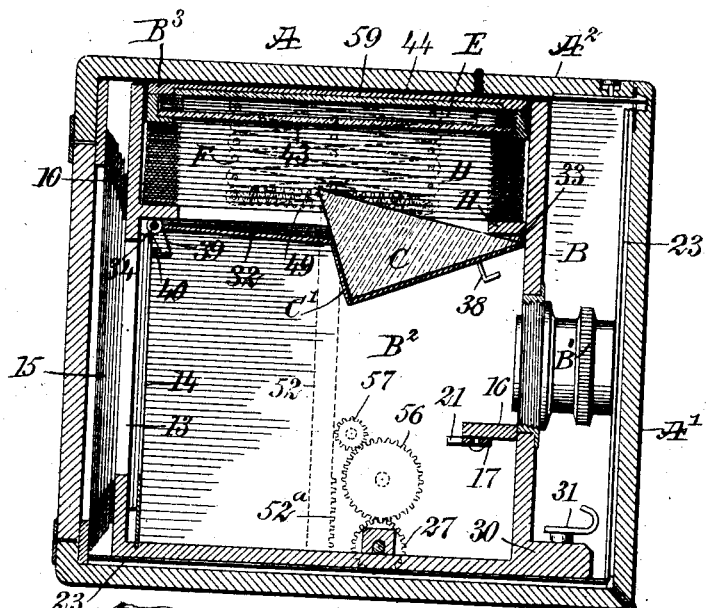
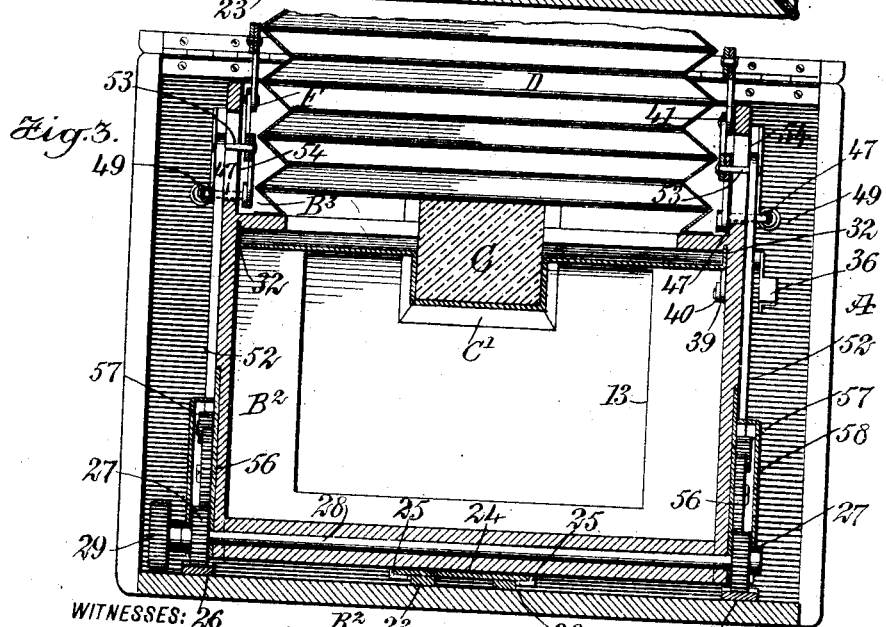
WITNESSES:
INVENTOR
Edward Lander Hall
BY
ATTORNEYS

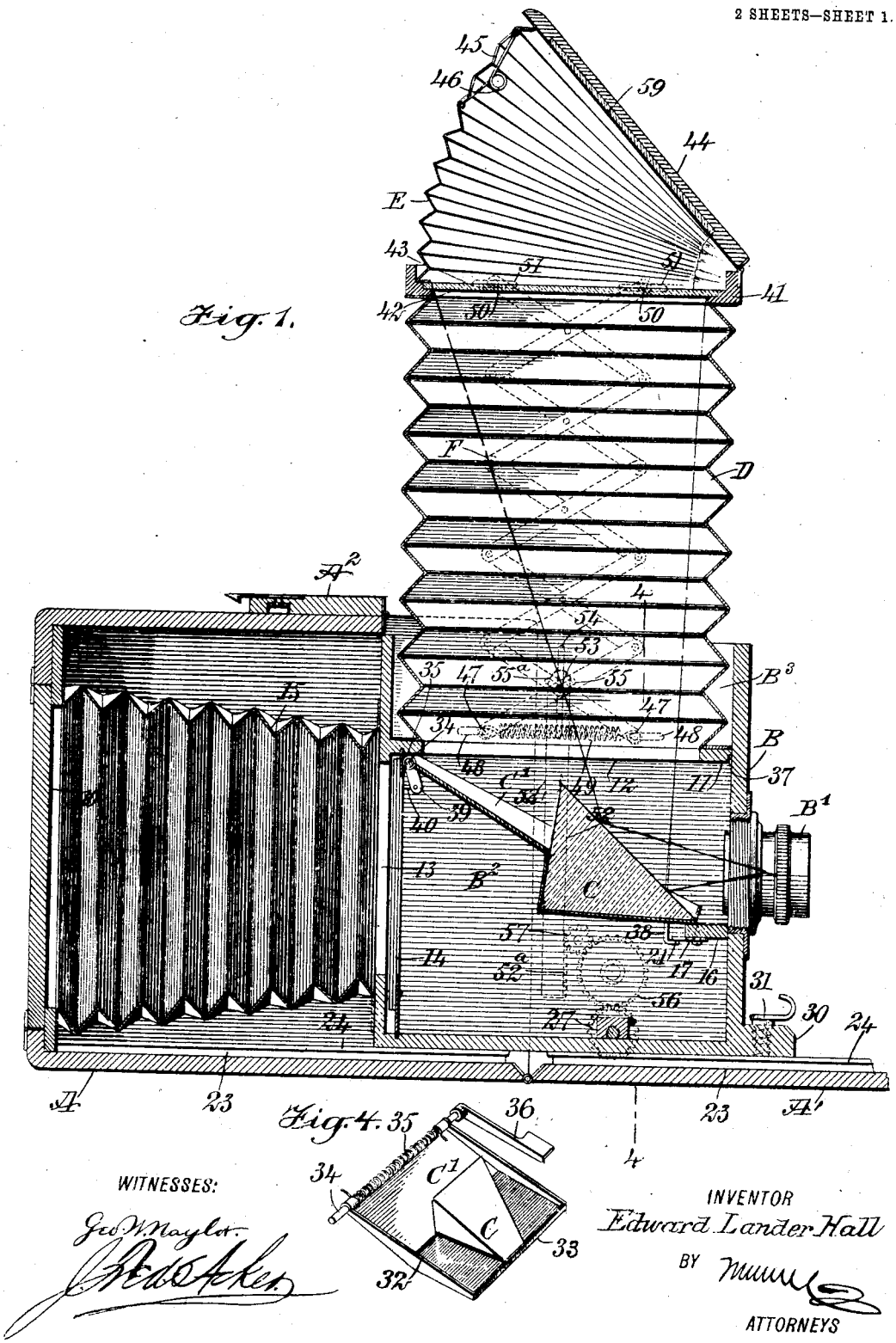

UNITED STATES PATENT OFFICE.

EDWARD LANDER HALL, OF NEW YORK, N. Y.

CAMERA.

No. 832,969.  Specification of Letters Patent.  Patented Oct. 9, 1906.

Application filed May 23, 1905. Serial No. 261,742.

*To all whom it may concern:*

Be it known that I, EDWARD LANDER HALL, a citizen of the United States, and a resident of the city of New York, borough of Brooklyn, in the county of Kings and State of New York, have invented a new and Improved Camera, of which the following is a full, clear, and exact description.

The purpose of the invention is to provide a simple and economic construction of camera wherein a prism is employed to reflect an image upon the focusing-glass and conveniently-operated means for obtaining an accurate focus by the movement of the lens-carrying section of the camera-box.

A further purpose of the invention is to provide a focusing-glass located above the prism and capable of movement to and from the same, which focusing-glass is at all times given the same proportional movement relative to the prism that the lens bears relative to the plane of the plate to be exposed when said plate is in position for exposure.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a longitudinal vertical section through the improved camera open for use. Fig. 2 is a vertical section through the camera when closed. Fig. 3 is an enlarged vertical transverse section through the camera-box and a portion of the focusing-bellows, the section being taken practically on the line 4 4 of Fig. 1. Fig. 4 is a perspective view of the prism and carrier therefor, and Fig. 5 is a detail horizontal section taken through the lens-carrying portion of the camera at a point below the lens-opening.

A represents the box-body of the camera, which box-body is provided with a front $A'$, hinged to the bottom of the body in a manner to drop down to the horizontal position shown in Fig. 1.

$A^2$ represents a small upper lid-section hinged to the fixed upper section of the box-body at its forward portion, and when the box-body is closed the upper hinged cover portion $A^2$ has proper latch engagement with the front drop-section $A'$ when said section is closed. In the further construction of the box-body it is provided with the customary opening 10 at the back to receive a plate-holder.

B represents the lens-carrying section of the camera. This section B is of box-like construction and is of such formation that it can be slid completely into the box-body A when not in use, as is illustrated in Fig. 2. The lens-carrying section B is provided with any form of lens $B'$ and is divided by an upper partition 11 into a lower or view chamber $B^2$ and an upper compartment $B^3$, which is open at the top. In the partition 11 an opening 12 is made for focusing purposes. In the further construction of the lens-carrying section B of the camera an opening 13 is made in the back, and the shutter 14 is placed in front of the said opening 13 in the view-chamber $B^2$. The shutter preferably employed is that which is commonly known as a "self-setting" shutter. The lens-carrying section B of the camera is connected with the box-body A at its rear portion by a bellows 15, (best shown in Fig. 1,) the bellows being attached to the box-body A around its rear opening 10 and to the rear side of the lens-carrying section B around the rear opening 13 therein.

Just below the lens-opening in the lens-carrying section B of the camera a horizontal shelf 16 is constructed, and a latch-bar 17 is mounted to slide on the under face of the said shelf, as is particularly shown in Fig. 5. This latch-bar 17 is usually provided with longitudinal slots 18, and pins 19 are loosely passed through the said slots and into the said shelf. A spring 20 is secured to the inner end of the latch-bar and to an adjacent portion of the lens-carrying section B of the camera, and a latch-head 21 extends horizontally from about the central portion of the inner longitudinal edge of the said latch-bar, as is shown in Figs. 1 and 5, the said latch-head 21 having one of its edges more or less beveled. A handle 22 is secured to the outer end of the latch-bar 17, which handle 22 extends out through a side of the lens-carrying section B.

The lens-carrying section B is guided in focusing on the bottom of the box-body and the inner face of the drop front A' when the latter is in the horizontal position (shown in Fig. 1) usually by ribs 23 on the central portions of the bottom of the box-body and the central portion of the inner face of the drop-front A' and a plate 24 on said ribs, which plate extends beyond the outer sides of the ribs, as is illustrated in Fig. 3, and on the bottom of the lens-carrying section B of the camera angle-guides 25 are secured, which engage with the projecting portions of the plate 24, as is also shown in Fig. 3.

The lens-carrying section B may be given any fine adjustment in any approved manner—as, for example, through racks 26 adjacent to each side edge of the drop-front A', which racks 26 are engaged by pinions 27, located at the outer side portions of the said lens-carrying section, and the said pinions are secured upon a shaft 28, extending through from side to side of the said lens-carrying section B and provided with a knob or milled head 29 at one end, and the said lens-carrying section B of the camera-box is provided with a forwardly-extending ledge 30 at its front lower portion, in which ledge a screw-clamp 31 or its equivalent is located for the purpose of holding the lens-carrying section B of the camera in the position to which it may have been adjusted.

C represents a prism which when focusing occupies a position in the viewing-chamber B² slightly to the rear of the lens B', its upper face being inclined from the rear downward in direction of the lens, and said prism consequently receives the image projected by the lens.

C' represents an opaque carrier for the prism and is substantially in the form of a rectangular tray having side flanges 32 and a front flange 33. The rear portion of the carrier is secured to a shaft 34, mounted in the sides of the viewing-chamber B² at the rear just below the partition 11, and a spring 35, coiled around the shaft, acts to normally hold the carrier in substantially a horizontal position at the top of the viewing-chamber, covering the opening 12 at the top of the said chamber in a light-tight manner, and the flanges 32 and 33 of the carrier at such time enter grooves 37 in the under face of the said partition 11, as is shown in Figs. 2 and 3.

A crank-arm 36 is secured to one end of the shaft 35 wherewith to bring the prism-carrier to the inclined focusing position, (shown in Fig. 1,) and the carrier is held in this position during focusing by a keeper 38 on the under surface of the carrier locking with the latch-head 21, as is also shown in Fig. 1. When the carrier is in its inclined position, its front portion rests upon the shelf 16 and its sides engage with the side walls of the viewing-chamber, thus cutting off all light from the plate in position for exposure, and such protection of the plate is made doubly sure by reason of the location of the shutter.

As stated, the shutter employed is preferably a self-setting shutter, and said shutter is operated from the carrier-shaft 34 just as the carrier closes the opening 12 at the top of the viewing-chamber, and such action is usually accomplished by an arm 39 from the shaft within the viewing-chamber and connecting with the trip of the shutter, as is indicated at 40 in Figs. 1 and 2. After focusing the carrier C is permitted to fly upward by pressing in the latch 17. When the carrier is in its upper position, the only light admitted to the viewing-chamber and connected bellows 15 is that passing through the lens.

A focusing-bellows D is employed in connection with the prism C. This focusing-bellows opens and closes in a vertical direction, and the lower end of the said focusing-bellows is secured to the upper face of the partition 11, around the opening 12 therein. The upper portion of the focusing-bellows D is secured to the under face of a box-frame 41 around an opening 42 in said frame corresponding in size to the size of the opening 12 and being in registry with said opening. This frame 41 has fitted thereto the focusing ground glass 43, and a cover 44 is hinged at its front portion to the corresponding portion of the frame 41. The lower portion of a sight bellows or hood E is attached to the frame 41 around the ground glass 43 and to the under face of the cover 44, and in the rear upper portion of this bellows a sight-opening 45 is made. This opening 45 is kep extended by a suitable spring 46, located within the bellows E. When the bellows E and D are not required, the bellows E folds down within the frame 41 and the cover 44 rests upon said frame, while the focusing-bellows D folds down within the compartment B³ of the lens-carrying section B of the camera, taking with it the upper folded bellows E, as is shown in Fig. 2.

A lazy-tongs F is provided for each side of the focusing-bellows, the tongs being between the inner face of the compartment B³ and the outer face of the bellows, as s shown in Fig. 3. The lower ends of the lower members of the lazy-tongs are provided with outwardly-projecting pins 47, which extend through horizontal slots or openings 48, produced in the sides of the compartment B³, and the outer ends of the said pins 47 are connected with the ends of a spring 49, also horizontally located, as is shown by dotted lines in Fig. 1. The upper ends of the upper members of the lazy-tongs are provided with inwardly-extending pins 50, which pass through slots 51, made in the side portions of the frame 41, as is also shown by dotted lines in Fig. 1.

The fine adjustment of the focusing-bellows D is accomplished as follows: A vertical arm 52 is located at each outer side of the lens-carrying section B, the said arms being provided with rack-teeth 52ª at their lower forward edge, and in the upper portion of each adjusting-arm 52 a vertical slot 54 is made in the side of the lens-carrying section B of the camera, as is shown by dotted lines in Fig. 1 and by full lines in Fig. 3. Slots 55 and 55ª are made in the central portions of the lower members of the lazy-tongs, the said slots being made to register at their lower ends, and pins 53, secured to the upper ends of the adjusting-arms, are passed through the slots 54 in the section B of the camera and into the slots 55 and 55ª in the lazy-tongs, as is shown also in Figs. 1 and 3. The adjusting-arms 52 are operated simultaneously in the following manner: Gear-wheels 56 are mounted to turn on the outer side faces of the lens-carrying section B, which gears 56 mesh with the pinions 27, utilized for moving the lens-carrying section B forward and rearward to obtain a final focusing adjustment, and the gears 56 also mesh with pinions 57, which pinions 57 in their turn mesh with the teeth 52ª on the adjusting-arms 52. Preferably the gearing just described is contained within a box-casing 58. (Shown in Fig. 3.) The gearing and parts coacting therewith are so calculated that the forward or rearward movement of the lens-carrying section B of the camera will be identical and simultaneous with the upward or downward movement of the focusing-bellows D, as it is absolutely necessary that the focusing-bellows shall be carried up or down the exact distance that the lens-carrying section B of the box is moved forward or rearward. It is necessary that the distance between the lens and the plane of the plate be the same as the distance between the lens and the prism-face plus the distance from the prism-face to the ground-glass 43, these last distances being measured along a ray of light.

The adjustments are not only readily and simultaneously made, but the ground glass can be viewed with more convenience than in an ordinary camera.

It may be here remarked that when the lens-carrying section B is first moved out from the box-body A or until the pinions 27 reach the racks 26, at which time the combined bellows D and E will have been moved out from engagement with the top of the box-body, the springs 49 being then free to act will draw the lower ends of the lazy-tongs in direction of each other and automatically elevate the focusing-bellows D a distance corresponding to the distance of the horizontal movement of the said section B, and then, as has been stated, the fine adjustment is brought about by operating the shaft 28, controlling the pinions 27.

In the drawings I have illustrated a mirror 59 as embedded in the under face of the cover 44 for the sight hood or bellows E, but the said mirror 59 is not absolutely necessary.

Having thus described my invention, I claim as new and desire to secure by Letters Patent—

1. In a camera, a view-chamber, a prism within the chamber, a focusing-glass above the prism, means for adjusting the said glass relative to the prism, and means for adjusting the said view-chamber.

2. In a camera, an adjustable view-chamber, a prism and a carrier therefor adjustably mounted in the view-chamber, a bellows connected with the view-chamber at a point above the prism, a focusing-glass capping the said bellows, and means for simultaneously imparting the same relative movement to the view-chamber and focusing-glass.

3. In a camera provided with a plate-receiving opening, an adjustable view-chamber, a prism and a carrier therefor adjustably mounted in the said view-chamber, a support for the view-chamber having a section adapted to receive a plate to be exposed, a bellows connecting the plate-receiving opening with an opening in the rear of the view-chamber, a second bellows connected with the view-chamber at a point above the prism, a focusing-glass capping the said second bellows, means for simultaneously imparting the same relative movement to the view-chamber and focusing-glass, a support for the said focusing-glass, and an adjustable sight-hood attached to the said support above the glass.

4. In a camera, a box-body having an opening for the reception of a plate-holder, a lens-carrying section mounted to slide in the said body, which lens-carrying section is provided with a view-chamber having an upper opening, a bellows connection between the body and the lens-section at the rear opening of the body and the rear opening of said chamber, a prism and holder therefor adjustably mounted in the view-chamber, a focusing-glass adjustably supported above the prism and connected with the view-chamber, and means for adjusting the focusing-glass and the lens-carrying section.

5. In a camera, a box-body having a rear opening, an adjustable lens-carrying section for the said box-body, provided with a view-chamber having an opening at the rear and an opening at the top, a bellows attached to the camera-box at its rear opening and to the lens-carrying section at its rear opening, a bellows secured to the lens-carrying section at the upper opening in the view-chamber, a focusing-glass located at the upper end of the latter-named bellows, a prism and a carrier therefor movably mounted in the view-chamber, means for locking the prism at a point at the rear of the lens, means for tripping the said prisms-carrier and carrying it to an upper position, and devices whereby the focusing-bellows is raised and lowered by the movement of the lens-carrying section the same relative distance.

In testimony whereof I have signed my name to this specification in the presence of two subscribing witnesses.

EDWARD LANDER HALL.

Witnesses:
   JNO. M. RITTER,
   C. E. HOLSKE.